United States Patent [19]

Sartor

[11] Patent Number: 4,844,862
[45] Date of Patent: Jul. 4, 1989

[54] HAIRPIN SPRING FOR NUCLEAR FUEL ASSEMBLY AND GRID INCLUDING SUCH SPRINGS

[75] Inventor: Pierre-Jean Sartor, Lyons, France

[73] Assignees: Framatome, Courbevoie; Compagnie Generale des Matieres Nucleaires, Velizy Villacoublay, both of France

[21] Appl. No.: 150,118

[22] Filed: Jan. 29, 1988

[30] Foreign Application Priority Data

Jan. 29, 1987 [FR] France ................................ 87 01085

[51] Int. Cl.⁴ .................................................. G21C 3/34
[52] U.S. Cl. ...................................... 376/441; 267/158
[58] Field of Search ....................... 376/441, 442, 462; 267/158, 164

[56] References Cited

U.S. PATENT DOCUMENTS

| | | | |
|---|---|---|---|
| 1,936,431 | 11/1933 | Halapleus | 267/164 |
| 3,762,996 | 10/1973 | Milburn et al. | 376/441 |
| 3,801,088 | 4/1974 | Piepers et al. | 376/441 |
| 3,804,354 | 4/1974 | Weiss | 376/441 |
| 3,886,038 | 5/1975 | Raven | 376/441 |
| 4,411,862 | 10/1983 | Leclercq et al. | 376/442 |
| 4,544,522 | 10/1985 | Curulla et al. | 376/441 |
| 4,578,240 | 3/1986 | Cadwell | 376/441 |
| 4,646,431 | 3/1987 | Veré et al. | 29/723 |
| 4,702,881 | 10/1987 | Weiland et al. | 376/442 |

FOREIGN PATENT DOCUMENTS

| | | | |
|---|---|---|---|
| 2474229 | 7/1981 | France . | |
| 0206794 | 11/1984 | Japan | 376/441 |
| 0117183 | 6/1985 | Japan | 376/442 |
| 0970002 | 10/1982 | U.S.S.R. | 267/158 |

Primary Examiner—Deborah L. Kyle
Assistant Examiner—Daniel Wasil
Attorney, Agent, or Firm—Pollock, Vande Sande & Priddy

[57] ABSTRACT

A hairpin spring for holding a fuel rod in a fuel assembly grid consists of a metal strip bent to form two mutually confronting legs arranged to be welded together locally. At least in a zone which bears on the other leg, one of the legs is U-shaped and straddles the other leg through a respective window of the grid. The legs of the U may be formed as appendices bent substantially at 90°. The arms may also close up slightly so that the other leg can snap thereinto or flare for self-centering of the other arm.

9 Claims, 2 Drawing Sheets

FIG.1.
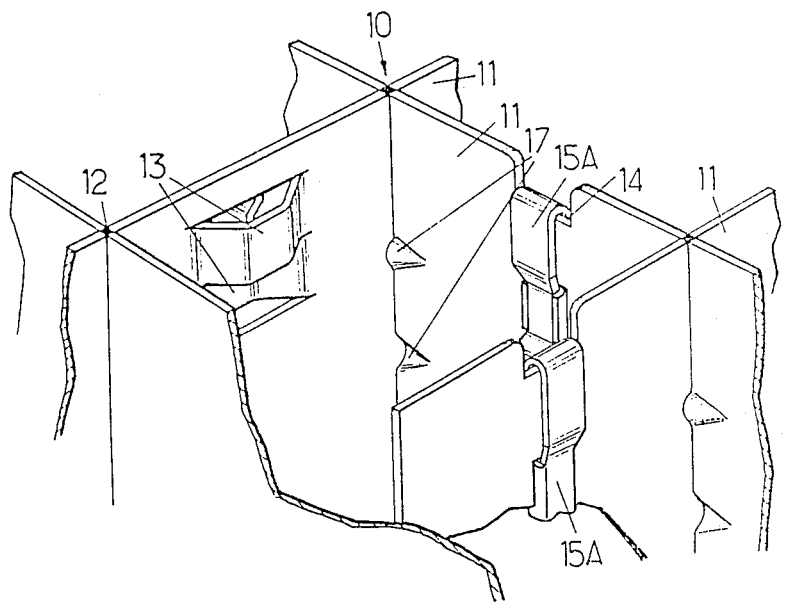
FIG.2A. FIG.2B.
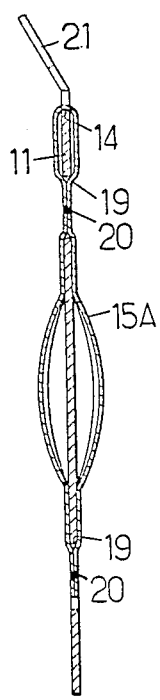 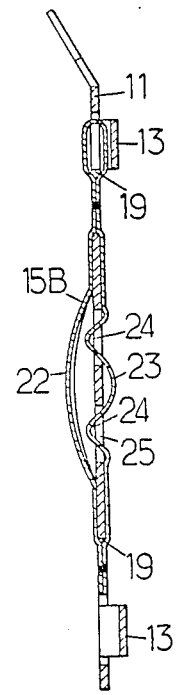

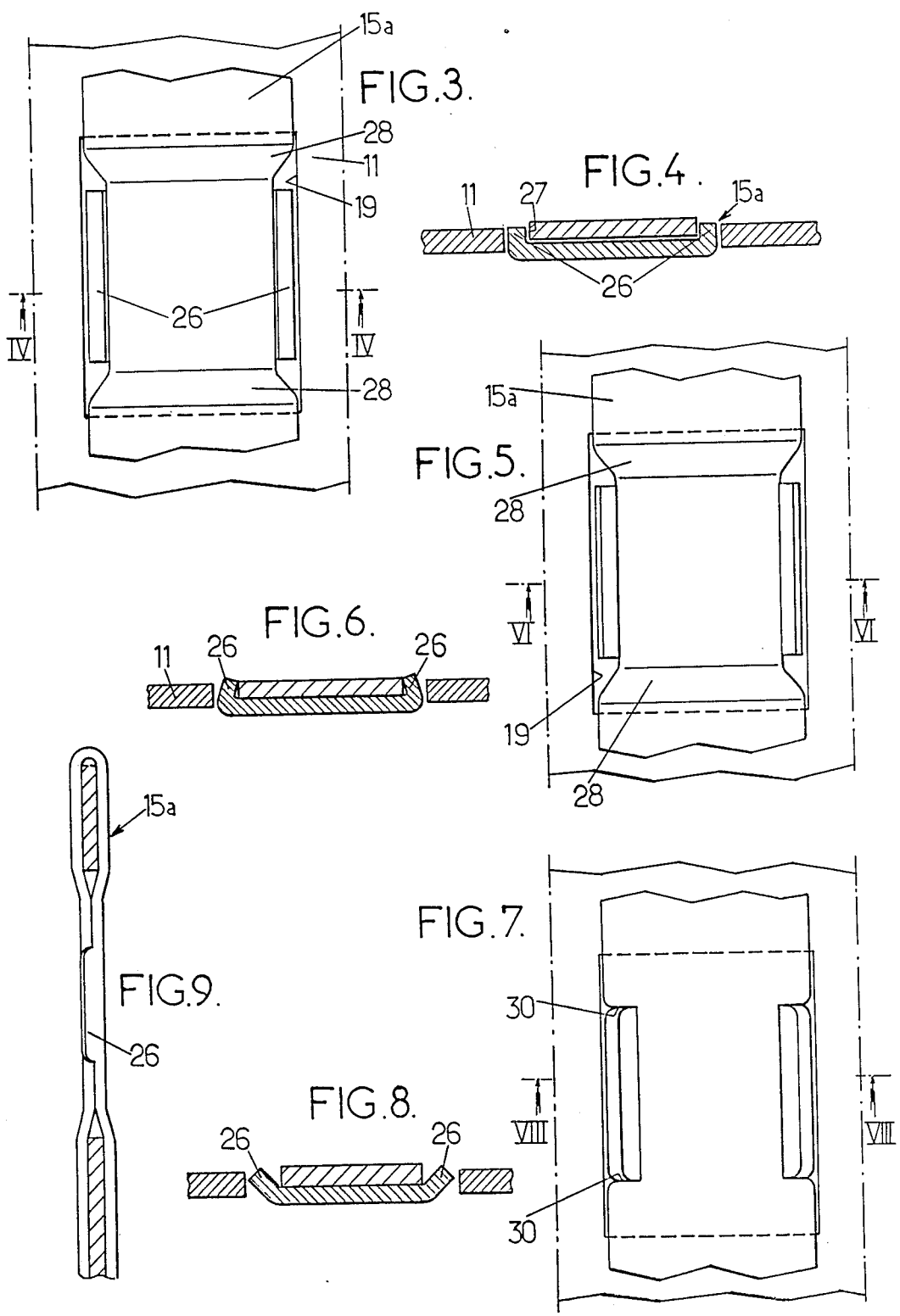

HAIRPIN SPRING FOR NUCLEAR FUEL ASSEMBLY AND GRID INCLUDING SUCH SPRINGS

BACKGROUND OF THE INVENTION

1. Field of the Invention

The invention relates to nuclear fuel assemblies and more precisely to hairpin springs for supporting the fuel rods in spacing grids belonging to such assemblies.

2. Description of the Prior Art

Fuel assemblies used at the present time in light water cooled and moderated reactors include a bundle of fuel rods (each formed by a stack of fuel pellets in a sealed sheath) held in a regular pattern in a structure. The structure includes two end nozzles joined together by tie rods replacing the fuel rods at some nodal points of the pattern and grids spaced apart along the assembly and formed by plates disposed in two mutually orthogonal directions so as to define cells most of which are traversed by fuel rods. Each cell is provided with means bearing on and supporting the fuel rod which passes through the cell.

The supporting means may be formed as parts cut out in the plates, forming lugs which frictionally bear against the rods. Since they must be of a material which retains satisfactory mechanical properties under irradiation, the whole grid must then be of a material having a low neutron capture cross-section, for instance one of the zirconium based alloys. It has consequently been found advantageous to use springs fixed to the plates rather than springs integral with the plates. Then the springs may be of a material different from that of the plates (for example "Inconel" instead of a zirconium based alloy). A grid of the latter type is described for example in French Pat. No. 2,474,229 to which reference may be made.

The springs are typically in the shape of a hairpin with two legs. Often, several types of spring need be provided in the same grid, because the grid has lateral as well as internal plates and often some cells are occupied by elements other than fuel rods, for example by tie rods also forming guide tubes. A frequently used type of spring has two identical legs, whereas another type of spring has different legs. Each spring is inserted, then secured to a plate by welding the two legs to each other in well-defined zones, through windows formed in the plate.

Positioning each spring is delicate: it is necessary to locate it accurately so as not to clamp it on the plate during welding and to avoid contamination by welding projections. During welding through an upper window, it may happen that the spring is fixed in an angular position such that the legs do not face the lower window. A defect may also result from an accidental mutual shifting of the two legs with respect to each other or from lack of contact during welding.

Such defects cannot be accepted in a grid. An excessive rod clamping force, which could cause local destruction of the sheath during differential heat expansion, and an insufficient force which would result in vibrations during use and wear of the sheath should be avoided.

Spring positioning devices are already known which considerably reduce the risk of faulty positioning of the springs with respect to the grid plate which receives it (U.S. Pat. No. 4,646,431 to Vere et al). But the risk is not completely excluded, particularly if springs are distorted.

SUMMARY OF THE INVENTION

It is an object of the invention to provide a hairpin spring for nuclear fuel assembly grids whose shape achieves mutual correct positioning of the two legs thereof and helps locating the springs on the grid plates in correct position.

For that purpose, there is provided a hairpin spring for holding a fuel rod in an assembly grid, which spring is formed as a metal strip bent to form two legs arranged to straddle a grid plate and to be joined together by welding through windows formed in the grid plate, wherein one of the legs, in at least a zone so located as to bear on the other leg, has a U shape of a width corresponding to the width of the other leg in that same zone.

The other leg typically has a width locally reduced in the zone, so that the lateral size of the U corresponds to that of the remainder of the spring. The lateral size of the U may be slightly smaller than the width of the windows: then the arms of the U engage into the window and accurately position the spring on the plate; by straddling the other leg of the spring, the arms of the U mutually position the two legs.

The two arms of the U may be bent back substantially at 90°. They may alternately close up slightly, so that the other leg may snap onto the one which includes the U. On the other hand, this solution does not provide relative self-centering of the legs. In some cases, it will be preferable to adopt a widening shape of the U to promote self-centering.

The invention also provides a grid formed by plates disposed in at least two directions for defining cells, some at least of the plates having springs of the above-defined kind of a material retaining its resilience under radiation, whereas the plates are of an alloy having a low neutron capture cross-section, such as a zirconium base alloy.

BRIEF DESCRIPTION OF THE DRAWINGS

The invention will be better understood from the following description of particular embodiments, given by way of examples. The description refers to the accompanying drawings, in which:

FIG. 1 is a perspective view of a fragment of a fuel assembly grid provided with springs according to an embodiment of the invention;

FIGS. 2a and 2b are sectional views through a vertical plane, respectively showing a double spring (with two active legs) and a single action spring (one leg of which forms a spring and the other forms an abutment);

FIG. 3 is an enlarged detail view, in elevation, showing the construction of the legs of the springs shown in FIGS. 1 and 2a, in the welding zones;

FIG. 4 is a sectional view through line IV—IV of FIG. 3;

FIGS. 5 and 6, similar to FIGS. 3 and 4, show a modification of the invention;

FIGS. 7 and 8, again similar to FIGS. 3 and 4, show yet another modification; and FIG. 9 is a right hand view of FIG. 7 which better shows the mutual engagement of the two legs of the spring.

DESCRIPTION OF PREFERRED EMBODIMENTS

The grid 10 partly shown in FIG. 1 is of generally conventional construction, which may for example be that described in French Patent No. 2,474,229. It will therefore not be described in detail. Grid 10 is formed by two orthogonal sets of plates 11, typically of "zircaloy" base alloy, lap-joined and welded at their connection points 12. However, other materials having a low neutron capture cross-section may be used.

Each plate 11 is formed with bosses 13 for holding fuel rods (not shown) in position and with windows cooperating with springs which apply the rods on the bosses. Referring to FIG. 1, only double springs 15a are shown which are inserted into indentations 14 formed in one of the edges of the plates. The springs are of a material retaining resiliency after irradiation, which may have a neutron capture cross-section higher than that of the plates.

As shown in FIG. 2a, each of springs 15a may be positioned by sliding its legs on each side of plate 11 until the upper loop of the spring comes into abutting contact with the plate, at the bottom of the indentation 14. Windows 19 are formed in the plate for allowing direct connection of the two legs of the spring on each other by spot welding at 20.

The single-action spring 15b shown in FIG. 2b is disymmetric in construction. Its leg 22 is similar to the legs of spring 15a. The other leg 23 is designed to form a swivel joint defined by two bends 24 arranged to engage leg 22 through apertures 25 in the plate, to avoid transmitting the compression forces therethrough. As in the preceding case, the two legs of spring 15b are welded together through windows 19 in the grid. On the other hand, the loop is not positioned at the bottom of an indentation, but in an extension of the upper window 19, formed by one of the stamped-out bosses 13.

As shown, one of the legs of each spring has a portion of reduced width in at least one zone and that portion is formed to be received on the other leg which has a U shape in the same zone.

In the embodiment shown in FIGS. 1, 3 and 4, the reduction of width of the first leg is such that gaps are formed between the reduced width portion and the edges of window 19 of a size at least equal to the thickness of the strip forming the spring. The other leg is locally of increased width to form appendices 26 which are bent substantially at 90° towards the first leg. The appendices 26 consequently constitute arms which straddle the reduced width portion. They advantageously have a height almost equal to the thickness of the plate (FIG. 4) so as to retain the first leg laterally and to be locked in the window 19.

To facilitate insertion of the reduced width portion into the U-shaped leg and to avoid excessive stresses, the bends 27 of appendices 26 are rounded rather than sharp. Again for decreasing stresses, the reduced width portion merges with the current part of the spring gradually, for example through a trapezoidal portion 28 rather than by a 90° step.

In the embodiment shown in FIGS. 5 and 6, where the parts corresponding to those of FIGS. 3 and 4 are designated by the same reference numbers, the appendices 26 are so bent that the arms of the U close up slightly. Thus, the reduced width portion snaps into the bottom of the U and is retained therein, which is favorable for safe welding. On the other hand, that does not provide guidance facilitating positioning of the reduced width portion into the U.

In the modification shown in FIGS. 7, 8 and 9, the appendices 26 are so bent that the arms of the U flare and guide the reduced width portion during insertion. The reduced width corresponds to the width at the bottom of the U (FIG. 8) so that there may be axial clamping of the legs one against the other. Instead of having trapezoidal connection portions, the spring shown in FIGS. 7 and 9 has portions with curved edges 30 which better position the two legs longitudinally with respect to each other.

The invention is not limited to the particular embodiments which have been described above. Numerous modifications are possible. If, in particular, it is desired to avoid an extra width of the strip from which the spring is cut out at the locations of the appendices, the width of the narrowed portion may be further reduced and the arms of the U may then be defined by slits formed in the current part of the strip.

Whatever the embodiment, the invention makes it possible to improve the welding conditions and consequently quality of welding; it achieves complete and mutual contact of the two legs and limits the welding projections on the grid plates. Lateral positioning of the springs is also improved particularly in so far as overlapping, gaping of the blades and absence of freedom of movement of the springs are concerned.

I claim:

1. A spacing grid assembly for a nuclear fuel assembly, comprising:
   a plurality of plates disposed in two directions at least for defining cells having a predetermined mutual spacing and formed with windows distributed at even intervals corresponding to the mutual spacing of said cells, and
   a plurality of hairpin springs each consisting of a metal strip bent to form two mutually confronting legs welded together through said windows,
   wherein the cross-section of one of said legs of each of said hairpin springs in a direction perpendicular to said legs of the respective one of the hairpin springs has a U shape in a zone bearing on the other leg of the hairpin spring through a respective one of said windows and said U has a width slightly greater than the width of the other leg in the same zone so as to receive said other leg.

2. The spring as claimed in claim 1, wherein the U has a lateral size which corresponds to the width of the windows to be received therein.

3. The spacing grid as claimed in claim 1, wherein said springs are of a material retaining resiliency after irradiation and said plates are of an alloy having a low neutron capture cross-section as compared with said material.

4. The spacing grid as claimed in claim 1, wherein said other leg has a locally decreased width in said zone, so that the lateral size of the U corresponds to that of the remainder of the spring.

5. A hairpin spring for use in holding a fuel rod in position in a fuel assembly grid, consisting of an elongated metal strip having a 180° bend to form two mutually confronting legs each having a zone of limited extent in the direction of elongation which bears on a mating zone of the other, said zones being arranged to be welded together locally and wherein one of said legs only has a U shape in its said zone and said U shape has a width slightly greater than the width of the other leg in the respective zone so as to receive said other leg in flat contact abutment.

6. The spring as claimed in claim 5, wherein the U has a widening shape for self-centering of the other leg.

7. A hairpin spring for use in holding a fuel rod in position in a fuel assembly grid, consisting of a metal strip bent to form two mutually confronting legs arranged to be welded together locally, wherein one of said legs has two lateral appendices bent substantially at 90° which impart to said one of the legs a U shape, at least in a zone which bears on the other leg and said U shape has a width slightly greater than the width of the other leg in the same zone so as to receive said other leg.

8. The spring as claimed in claim 7, wherein the appendices of the U close up slightly so that the other leg can snap therebetween.

9. The spring as claimed in claim 7, wherein said other leg has portions for progressive merging of a current part and the portion of reduced width retained by the U.

* * * * *